United States Patent [19]

Elliott et al.

[11] Patent Number: 4,642,538
[45] Date of Patent: Feb. 10, 1987

[54] ELECTRIC MOTOR SPEED CONTROLLER SUPPLY CIRCUIT FOR A MOTOR VEHICLE

[75] Inventors: James O. Elliott, Beavercreek; Dennis J. Ricker, Huber Heights, both of Ohio

[73] Assignee: General Motors Corporation, Detroit, Mich.

[21] Appl. No.: 825,608

[22] Filed: Jan. 31, 1986

[51] Int. Cl.⁴ .............................................. H02P 1/00
[52] U.S. Cl. ..................................... 318/139; 318/341
[58] Field of Search ....................... 318/139, 341, 599

[56] References Cited

U.S. PATENT DOCUMENTS

| | | | |
|---|---|---|---|
| 4,279,020 | 7/1981 | Christian et al. | 364/900 |
| 4,415,249 | 11/1983 | Tsuzuki et al. | 318/139 X |
| 4,455,623 | 6/1984 | Wesemeyer et al. | 364/900 |
| 4,471,276 | 9/1984 | Cudlitz | 318/139 X |
| 4,514,665 | 4/1985 | Melocik et al. | 318/139 |
| 4,518,902 | 5/1985 | Melocik et al. | 318/139 X |

*Primary Examiner*—Benjamin Dobeck
*Attorney, Agent, or Firm*—Mark A. Navarre

[57] ABSTRACT

Battery current is drawn by a motor vehicle electric motor speed controller through an electronic switch. The load current carrying circuit of the switch is made conductive to permit battery current to be drawn by the controller when a motor speed command signal indicates a non-zero desired motor speed, and nonconductive to prevent substantial battery current from being drawn by the controller when the motor speed command indicates a desired motor speed of zero.

2 Claims, 2 Drawing Figures

ELECTRIC MOTOR SPEED CONTROLLER SUPPLY CIRCUIT FOR A MOTOR VEHICLE

This invention relates to a motor vehicle electrical supply circuit, and more particularly to a supply circuit which supplies current from the vehicle storage battery to an on-board electronic speed controller for an electric motor.

In conventional motor vehicle electric supply circuits, the battery current required to operate an electric motor controller is supplied through the ignition switch or a mechanical circuit breaker (such as a relay) operated by the ignition switch. In this way, the motor controller is unable to draw battery current when the vehicle is not in operation. However, this approach is less than optimum due to the resulting increase in wiring complexity and time of installation. In addition, the system reliability may be compromised by the use of mechanical circuit breakers.

The present invention is directed to an improved motor vehicle supply circuit for supplying battery current to an electric motor speed controller without the use of an ignition switch or a mechanical circuit breaker. The supply circuit is responsive to the status of a controller input signal representative of the desired motor speed, and operates to supply battery current to the controller only when motor operation is desired.

In particular, the vehicle battery is connected directly to the controller through the load current carrying circuit of an electronic switching device, such as a transistor. The switching device is alternatively biased to a conductive state for which battery current may be drawn by the controller without substantial restriction or a nonconductive state for which substantially no battery current may be drawn by the controller.

The desired speed signal is a pulsed signal having a duty cycle which varies in direct relation to the desired motor speed. A biasing circuit responsive to the desired speed signal duty cycle operates to bias the electronic switching device to its conductive state when a nonzero desired motor speed is indicated and to its nonconductive state when a zero desired motor speed is indicated. Since the controller can only draw battery current when operation of the motor is required, its quiescent energy consumption is minimized. An energy storage element in the biasing circuit maintains the electronic switching device in its conductive state between the pulses of the desired speed signal.

In the preferred embodiment, the switching device, the circuit elements which control its conduction, the speed controller, and the motor itself are integrated into a single package. As a result, wiring complexity and installation are simplified; only three wires (+battery, −battery, and speed command) are required to effect the motor control.

Figures 1, 2:
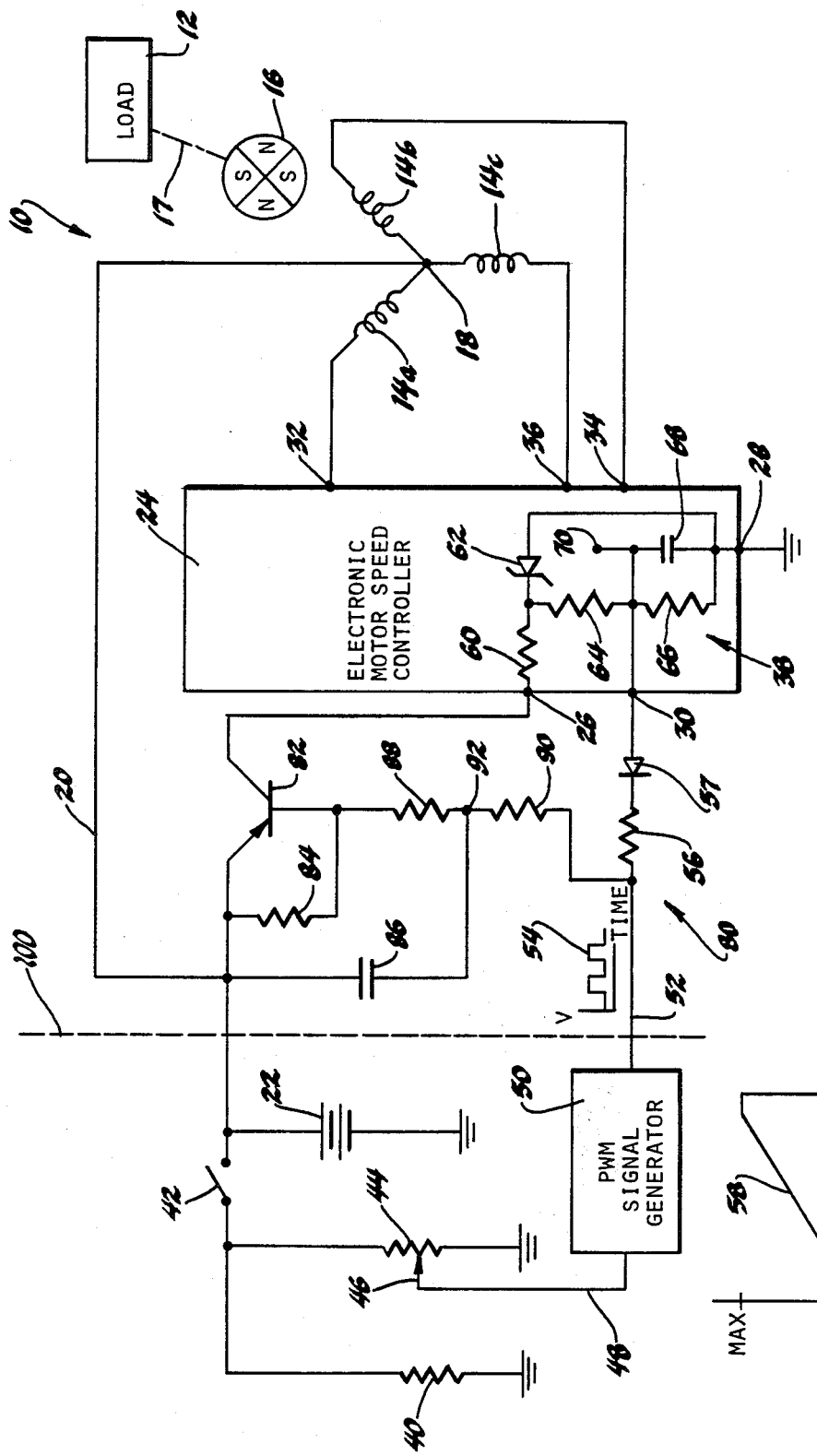
FIG. 1 is a circuit diagram depicting a motor vehicle storage battery, an electric motor, an electronic motor speed controller, and the power supply circuit of this invention.
FIG. 2 is a graph depicting the duty cycle of the desired speed signal as a function of the desired speed.

Referring to FIG. 1, the reference numeral 10 generally designates a brushless DC electric motor for operating a motor vehicle load 12, such as a ventilation blower. The motor 10 comprises a set of three phase WYE-connected stator windings 14a–14c and a permanent magnet rotor 16. The rotor 16 is connected to drive the load 12 as indicated by the broken line 17. In the case of a ventilation blower, the rotor 16 may be integral with the load 12 and disposed around the stator windings 14a–14c. The neutral or common terminal 18 of the stator winding set is connected via line 20 to the positive terminal of a vehicle storage battery 22. The negative terminal of the battery 22 is connected to the vehicle ground, as shown.

An electronic motor speed controller 24 is provided with power and ground terminals 26 and 28, respectively, and a desired speed input terminal 30 adapted to receive an electrical signal indicative of the desired speed for motor 10. The controller 24 output terminals 32–36 are connected to the the stator windings 14a–14c, and the controller 24 sequentially connects the terminals 32–36 to ground potential to energize the stator windings 14a–14c according to sensed position of rotor 16. The electronic controller includes desired speed signal conditioning circuitry as designated generally by the reference numeral 38, and various logic, feedback and driver devices for energizing the stator windings at a level which causes the actual motor speed to correspond with the desired speed. An electronic motor speed controller meeting the above requirements is set forth in greater detail in the co-pending patent application U.S. Ser. No. 825,607, filed Jan. 31, 1986, such application being assigned to the assignee of the present invention and incorporated herein by reference.

Many of the motor vehicle electrical loads, as represented by the resistor 40, are connected to receive battery current through an ignition switch 42 which is manually closed by the operator at the initiation of each period of vehicle operation. At the termination of each period of vehicle operation, the ignition switch 42 is manually opened, isolating the loads 40 from the battery 22.

The signal indicative of the desired motor speed may be obtained in a number of ways, one of which is depicted in FIG. 1. A potentiometer 44 is connected between the ignition switch 42 and ground potential, the position of its wiper 46 being adjusted manually or automatically in relation to the desired speed of motor 10. The wiper 46 is connected via line 48 to the Pulse-Width-Modulation (PWM) Signal Generator 50, which in turn, generates a PWM desired speed signal in accordance therewith on line 52.

The desired speed signal (graphically represented by the trace 54) is applied through the resistor 56 and diode 57 to the desired speed input terminal 30 of controller 24, and the desired speed signal conditioning circuit 38. The desired speed signal produced by the potentiometer 44 and PWM Signal Generator 50 has a duty cycle DC (percent high) that varies in relation to the desired motor speed $N_{des}$ as graphically indicated by the trace 58 of FIG. 2. Essentially, the duty cycle DC varies in direct relation to desired motor speed $N_{des}$ between the minimum motor speed MIN and the maximum motor speed MAX, a duty cycle of 95% or greater corresponding to a desired motor speed of zero. Alternatively, the desired speed signal may be generated by a voltage source or by a variable resistance to the vehicle ground, provided that a direct relationship between the voltage or resistance and the desired speed is maintained.

The desired speed signal conditioning circuitry 38 of controller 24 includes a voltage regulator comprising the resistor 60 and the Zener diode 62, a voltage divider comprising the resistors 64–66, and a filter capacitor 68. The voltage regulator is connected between power and ground terminals 26 and 28, and the divider is connected between the regulated voltage and ground terminal 28. The desired speed signal at input terminal 30 is connected through the junction of the divider to the speed command terminal 70, and the filter capacitor 68 is connected between the terminals 70 and 28 to provide an offset DC voltage at terminal 70 that is directly proportional to the desired motor speed.

The electronic motor speed controller 24 is connected to draw battery current through the power supply circuit of this invention, which is designated generally by the reference numeral 80. Essentially, the power supply circuit 80 comprises a PNP transistor 82, a resistor 84 connected across the emitter-base junction of transistor 82 for helping to maintain transistor 82 in its normally nonconductive state, and a biasing network comprising the capacitor 86 and the resistors 88 and 90 for biasing the transistor 82 to its conductive state when the desired speed signal applied to the controller input terminal 30 indicates a non-zero desired motor speed—that is, a duty cycle DC of less than approximately 95%. The resistors 88 and 90 are connected in series between the line 52 and the base of transistor 82. The capacitor 86 is connected between the emitter of transistor 82 and the junction 92 between resistors 88 and 90. The diode 57 provides isolation between the power supply circuit 80 and the motor speed controller 24.

As indicated above, transistor 82 is normally biased to its nonconductive state, isolating battery 22 from the controller 24. In such state, the drain on the battery 22 is limited primarily to the leakage current of transistor 82—about 400 uA. Whenever the desired speed signal on line 52 is at a logic zero voltage potential, two things occur. One, the base of transistor 82 is pulled low through the resistors 88 and 90, and the PWM Signal Generator 50, thereby overriding the resistor 84 and biasing transistor 82 to its conductive state. In such state, the electronic motor speed controller 24 is free to draw battery current through the emitter-collector circuit of transistor 82 without substantial restriction. Two, the capacitor 86 is charged through a circuit comprising the battery 22, the resistor 90, and the PWM Signal Generator 50. When the capacitor 86 is sufficiently charged, it independently forward biases the emitter-base junction of transistor 82, and serves to maintain the transistor 82 in its conductive state between the pulses of the desired speed signal.

The capacitor 86 and resistors 84, 88 and 90 are sized such that the transistor 82 is biased to its conductive state whenever the duty cycle of the PWM Signal Generator 50 is less than approximately 95%. When the duty cycle of the signal exceeds approximately 95%, indicating that the desired speed is zero, the capacitor 86 discharges through the emitter-base junction of transistor 82, and transistor 82 returns to its normal nonconductive state.

In the illustrated embodiment, the circuit values of the elements which comprise the power supply circuit 80 are as follows:

Transistor 82—ZTX-550
Resistor 84—15 k ohms
Capacitor 86—22 uF, 50 v
Resistor 88—15 k ohms
Resistor 90—1.5 k ohms.

The power supply circuit of this invention is particularly advantageous in that the use of an ignition switch or other mechanical circuit breaker between the battery 22 and the controller 24 is avoided. This not only increases the reliability of the control, but minimizes the wiring complexity. In the illustrated embodiment, the power supply circuit 80, the resistor 56, the diode 57, the controller 24 and the motor 10—all elements to the right of the broken line 100—are integrated into a single package. As a result, only three wires are required for installation: +battery, −battery, and desired speed signal.

While this invention has been described in reference to the illustrated embodiment, it will be recognized that various modifications thereto will occur to those skilled in the art and that circuits incorporating such modifications may fall within the scope of this invention, which is defined by the appended claims.

The embodiments of the invention in which an exclusive property or privilege is claimed are defined as follows:

1. In a motor vehicle electrical system having a storage battery, an electric motor for operating a vehicular load, a control device for providing a pulsed desired speed signal having a duty cycle which varies in relation to the desired motor speed, and an electronic controller adapted to receive battery current from the storage battery for controlling the motor in accordance with the desired speed signal, an electric supply system for connecting the storage battery and the electronic controller, comprising:

electronic switch means having a load current carrying circuit connected directly between the storage battery and the electronic controller to define a path by which battery current may be drawn by the controller, and a control terminal for electrically biasing the switch means to a first state wherein the controller is free to draw battery current through said load current carrying circuit without substantial restriction or a second state wherein substantially no battery current can be drawn through the load current carrying circuit; and biasing means connected to the control terminal of the electronic switch means for biasing the switch means between said first and second states according to the desired speed signal such that the switch means is biased to the first state to permit the draw of battery current by the electronic controller when the motor speed command signal corresponds to a non-zero desired motor speed indication, and to the second state to prevent substantial draw of battery current by the electronic controller when the motor speed command signal corresponds to a zero desired motor speed indication, the biasing means further including energy storage means connected to the control terminal of the electronic switch means and activated when the duty cycle of the motor speed command signal corresponds to a non-zero desired motor speed for maintaining the electronic switch means biased to said first state, thereby to permit continuous draw of battery current by the electronic controller between the pulses of said motor speed signal.

2. In a motor vehicle electrical system having a storage battery, an electric motor for operating a vehicular load, a control device for indicating a desired speed for the electric motor, and an electronic controller adapted to receive electric current from the storage battery for controlling the motor in accordance with the desired speed indication, an electric supply system for connecting the storage battery and the electronic controller which avoids the use of a mechanical circuit breaker and which minimizes the battery current drawn by the controller when motor operation is not required, the supply system comprising:

signal generating means responsive to the control device for generating a pulsed electrical speed command signal having a duty cycle that varies in direct relation to the desired speed indication, duty cycles in excess of a reference duty cycle corresponding to a desired speed indication of zero;

transistor means having an emitter-collector circuit connected directly between the storage battery and the electronic controller to define a path by which battery current may be drawn by the controller, and a base terminal for electrically biasing the transistor means to a conductive state wherein the controller is free to draw battery current through said emitter-collector circuit without substantial restriction or a nonconductive state wherein substantially no battery current can be drawn through the emitter-collector circuit; and biasing means including first and second series resistors connected between the base terminal of the transistor means and the motor speed command signal, and a capacitor connected between the battery and the junction of said first and second series resistors, the transistor means being normally biased to its nonconductive state to prevent substantial draw of battery current by the electronic controller, and the capacitor and the first and second series resistors being effective when the duty cycle of the motor speed command signal exceeds the reference duty cycle to override the normal bias and to bias the transistor means to its conductive state thereby to permit the draw of battery current by the electronic controller without substantial restriction whenever a non-zero desired motor speed is indicated.

* * * * *